United States Patent
Stanley

(10) Patent No.: US 6,609,055 B2
(45) Date of Patent: Aug. 19, 2003

(54) OCCUPANT DETECTION SYSTEM

(75) Inventor: James G. Stanley, Novi, MI (US)

(73) Assignee: Automotive Systems Laboratory, Inc., Farmington Hills, MI (US)

(*) Notice: Subject to any disclaimer, the term of this patent is extended or adjusted under 35 U.S.C. 154(b) by 0 days.

(21) Appl. No.: 10/065,587

(22) Filed: Oct. 31, 2002

(65) Prior Publication Data

US 2003/0083795 A1 May 1, 2003

Related U.S. Application Data

(60) Provisional application No. 60/335,709, filed on Oct. 31, 2001.

(51) Int. Cl.⁷ .............................................. B60R 22/00
(52) U.S. Cl. ....................... 701/45; 340/667; 280/735; 280/729; 180/273
(58) Field of Search ............................. 701/45–47, 36, 701/49; 340/667, 665, 562; 280/735, 734, 733, 729, 728.1, 730.1, 801.1; 180/272, 273, 271

(56) References Cited

U.S. PATENT DOCUMENTS

| | | | | |
|---|---|---|---|---|
| 5,913,536 A | * | 6/1999 | Brown | 280/730.2 |
| 6,043,743 A | * | 3/2000 | Saito et al. | 340/562 |
| 6,490,515 B1 | * | 12/2002 | Okamura et al. | 701/49 |
| 2002/0009273 A1 | * | 1/2002 | Akasaka et al. | 385/113 |
| 2002/0140215 A1 | * | 10/2002 | Breed et al. | 280/735 |
| 2003/0002690 A1 | * | 1/2003 | Breed et al. | 381/86 |
| 2003/0004628 A1 | * | 1/2003 | Rennaker et al. | 701/45 |
| 2003/0009270 A1 | * | 1/2003 | Breed | 701/29 |

FOREIGN PATENT DOCUMENTS

EP  1 066 178 B1  5/2002  .......... B60R/21/00

OTHER PUBLICATIONS

Reference Data for Engineers: Radio, Electronics, Computer, and Communications 7th edition, E.C. Jordan editor in chief, Howard W. Sams, 1985, pp. 12–3 through 12–12.
H. Philipp, "The Charge Transfer Sensor", Sensors magazine, Nov., 1996.

(List continued on next page.)

Primary Examiner—Thomas G. Black
Assistant Examiner—Ronnie Mancho
(74) Attorney, Agent, or Firm—Dinnin & Dunn, P.C.

(57) ABSTRACT

An occupant detection system comprises first and second electric field sensors mounted in or on a seat back of a seat, and at least one seat weight sensor. The first electric field sensor provides a measure of the central/inboard capacitance of a first electrode located proximate to an upper central region of a seating surface of the seat back, and extending downwards towards a middle inboard region of the seating surface. The second electric field sensor provides a measure of outboard capacitance of a second electrode located proximate to the outboard side of the seating surface. If the central/inboard capacitance is less than an associated central/inboard capacitance threshold, and if the measure of seat weight is less than an associated weight threshold, then the side air bag inflator is disabled. Otherwise if the outboard capacitance is greater than an associated outboard capacitance threshold, then a side ratio $SR=(W/M)^n \cdot (C_1/C_2)$ is calculated. If the side ratio is less than an associated side ratio threshold, then the side air bag inflator is disabled. Otherwise the side air bag inflator is enabled for deployment responsive to a signal from the side-impact crash sensor.

21 Claims, 6 Drawing Sheets

OTHER PUBLICATIONS

Jinno K.; Ofuji, M.; Saito, T.; Sekido, S.; "Occupant Sensing Utilizing Perturbation of Electric Fields", SAE 971051, Reprinted from: Anthropomorphic Dummies and Crash Instrumentation Sensors (SP–1261), SAE International Congress & Exposition, Detroit, MI Feb. 24–27, 1997.

Fink, Donald G. and Beaty, H. W.; Standard Handbook for Electrical Engineers 12th ed., McGraw–Hill Book Co, 1987, pp. 3–57 through 3–65.

Smith, J.R.; "Field Mice: Extracting hand geometry from electric field measurements", IBM Systems Journal, vol. 35, Nos. 3&4, 1996.

Occupant Detection System, U.S. Application Ser. No. 09/474,470, filed on Dec. 29, 1999.

Occupant Detection System, U.S. Application Ser. No. 09/474,473 filed on Dec. 29, 1999.

* cited by examiner

| # | A<br>SR < SR_Thr | B<br>C2 > C2_Thr | C<br>C1 < C1_Thr | D<br>W < W_Thr | Disable = (A And B) Or (C And D)<br>Side Air Bag Inflator Control | Illustration |
|---|---|---|---|---|---|---|
| 1 | False | False | False | False | Enable | |
| 2 | True | False | False | False | Enable | |
| 3 | False | True | False | False | Enable | Figs. 2a,2b |
| 4 | True | True | False | False | Disable | |
| 5 | False | False | True | False | Enable | |
| 6 | True | False | True | False | Enable | |
| 7 | False | True | True | False | Enable | |
| 8 | True | True | True | False | Disable | |
| 9 | False | False | False | True | Enable | |
| 10 | True | False | False | True | Enable | Figs. 2c,2d |
| 11 | False | True | False | True | Enable | |
| 12 | True | True | False | True | Disable | Figs. 3a,3b |
| 13 | False | False | True | True | Disable | Fig. 3c |
| 14 | True | False | True | True | Disable | Fig. 3c |
| 15 | False | True | True | True | Disable | |
| 16 | True | True | True | True | Disable | |

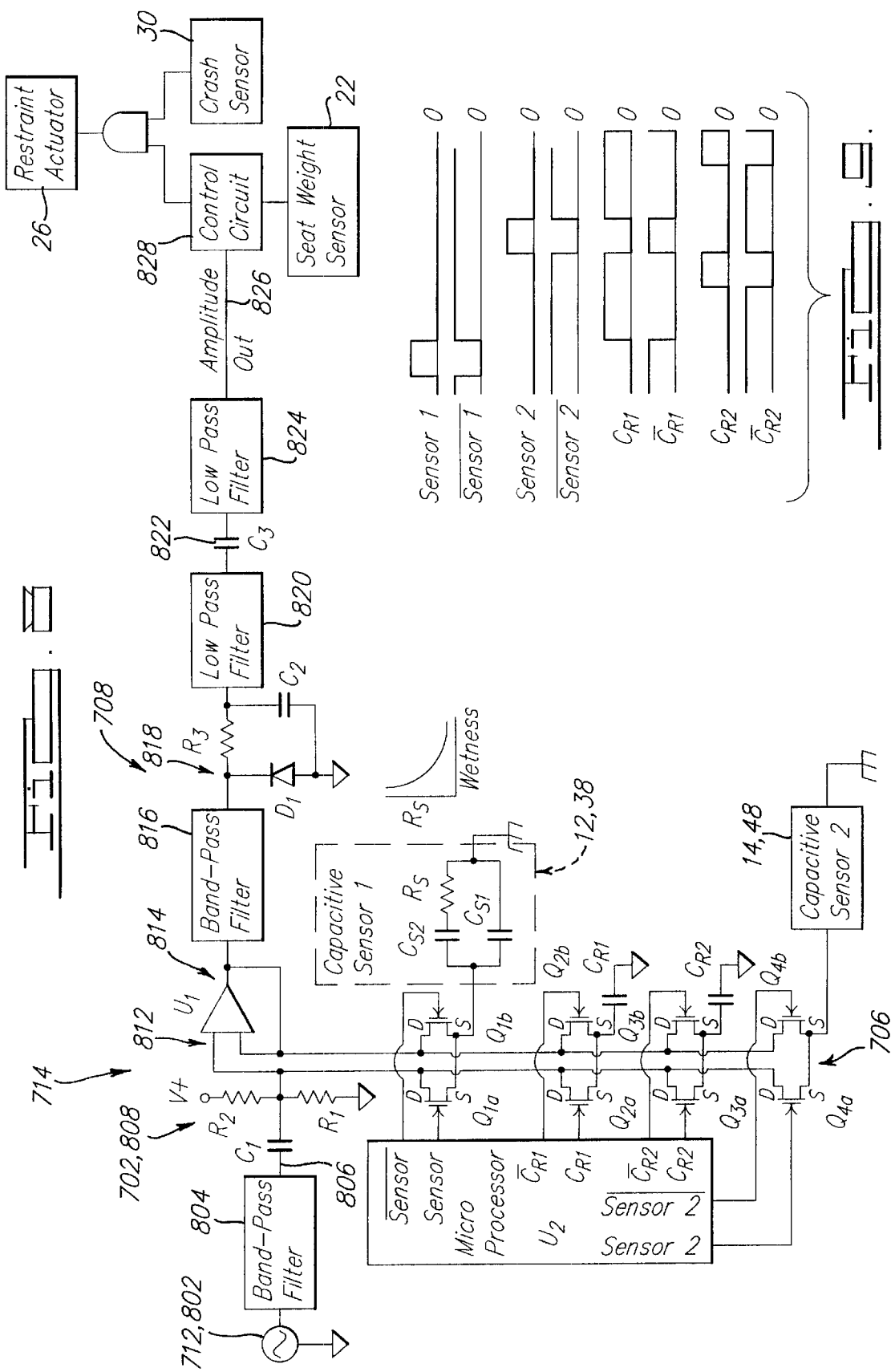

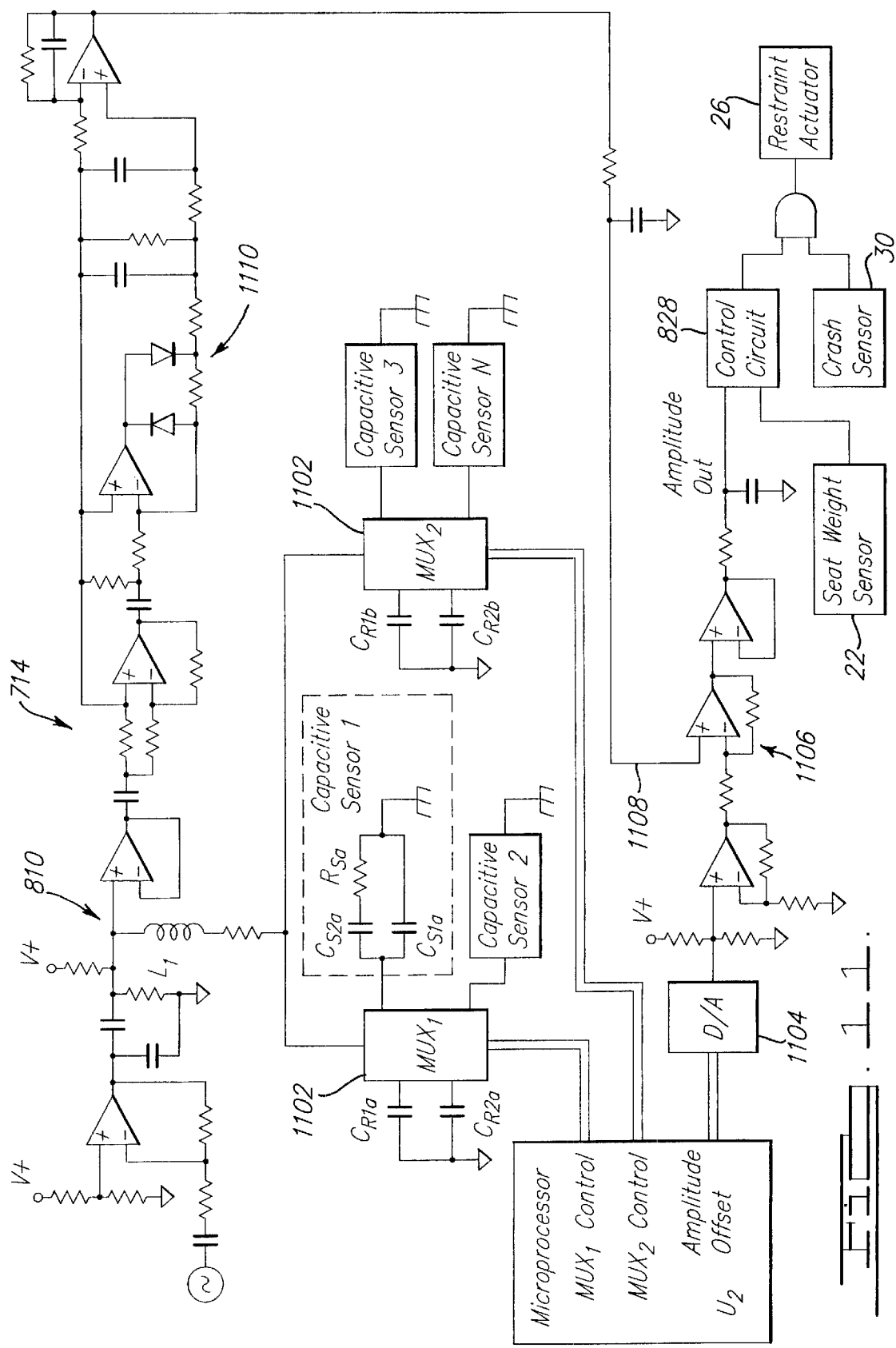

OCCUPANT DETECTION SYSTEM

CROSS REFERENCE TO RELATED APPLICATIONS

The instant application claims the benefit of U.S. Provisional Application Ser. No. 60/335,709 filed on Oct. 31, 2001, which is incorporated herein by reference.

In the accompanying drawings:

BRIEF DESCRIPTION OF DRAWINGS

FIG. 6 illustrates a decision logic table in accordance with the process of FIG. 5;

FIG. 8 illustrates an embodiment of a circuit for sensing capacitance and for controlling a restraint actuator responsive to capacitance measurements and responsive to a measure of seat weight;

FIG. 9 illustrates the operation of various switch elements of the sensing circuit of FIG. 8;

FIG. 11 illustrates another embodiment of a circuit for sensing capacitance and for controlling a restraint actuator responsive to capacitance measurements and responsive to a measure of seat weight.

DETAILED DESCRIPTION

Figure 1:
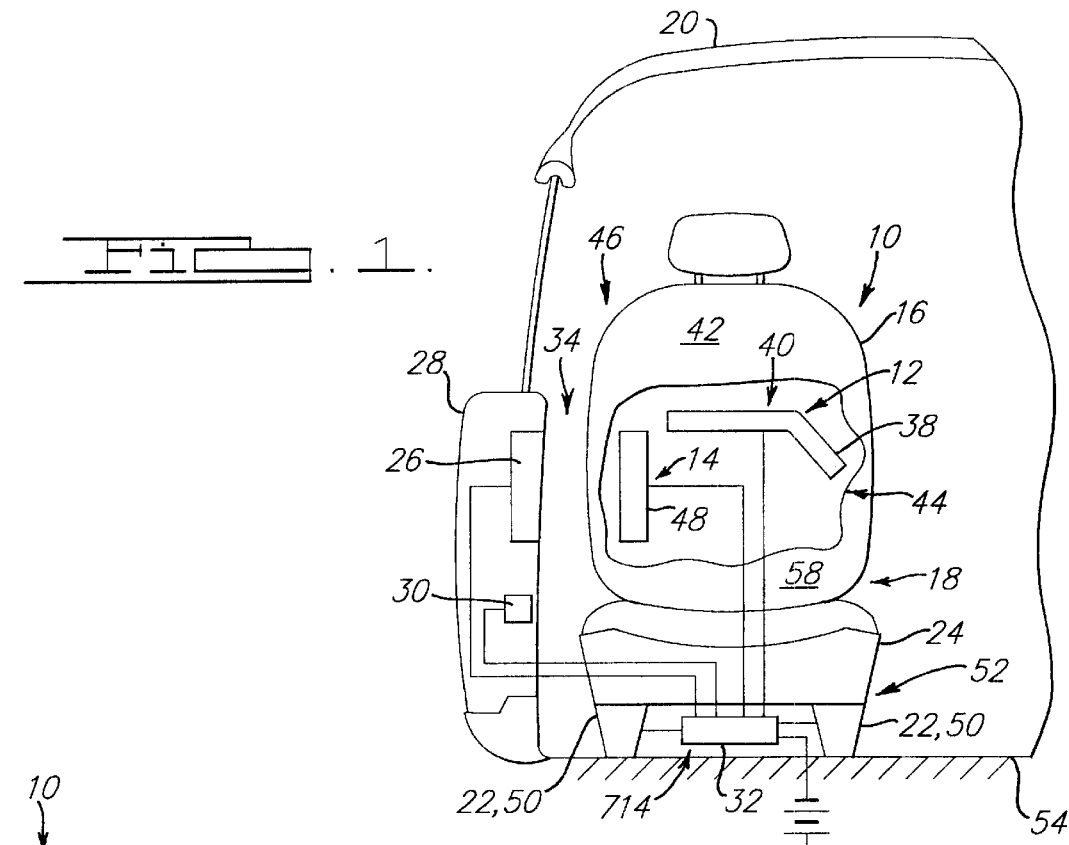
FIG. 1 illustrates an embodiment of an occupant detection system.

Referring to FIG. 1 an occupant detection system 10 comprises first 12 and second 14 electric field sensors mounted in or on the seat back 16 of a seat 18 of a vehicle 20, and at least one seat weight sensor 22 operatively connected to the seat 18, e.g. the seat base 24. The first 12 and second 14 electric field sensors detect the presence of an occupant in the seat 18, and the at least one seat weight sensor 22 measures at least a portion of a weight of an object or occupant on the seat 18. The vehicle 20 also incorporates a side air bag inflator 26 located so as to mitigate injury to an occupant in the seat 18 caused by a side-impact crash of the vehicle 20 from the outboard side of the seat 18. For example, the side air bag inflator 26 could be located in the door 28, as illustrated in FIG. 1, or in the side of the seat 18. Responsive to the detection of an associated side-impact crash by a side-impact crash sensor 30, the actuation of the side air bag inflator 26 is controlled by a controller 32 responsive to the detection of an occupant by the occupant detection system 10, as is described more fully hereinbelow. The controller 32 also includes circuitry for processing signals from the first 12 and second 14 electric field sensors and from the seat weight sensor 22. The controller 32 may be implemented with analog or digital circuitry, and can incorporate a microprocessor and associated memory and software.

One known problem with air bag inflators in general is that occupants too close to the air bag at the time of deployment i.e. out-of-position occupants may be vulnerable to injury from the deploying air bag even when the associated vehicle crash is relatively mild. Occupants who are of small stature or with weak constitution, such as children, small adults or people with frail bones are particularly vulnerable to injury induced by an air bag inflator if they are positioned too close to the air bag inflator module at the time of deployment thereof. The region proximate to the air bag inflator module within which an occupant would be at risk of injury is referred to herein as the "at-risk" zone 34.

The occupant detection system 10 is adapted to detect whether or not an occupant is likely positioned within the "at-risk" zone 34 of the side air bag inflator. 26, and to provide a signal that enables actuation of the side air bag inflator 26 responsive to the detection of a crash by a side-impact crash sensor 30 if an occupant is not likely within the "at-risk" zone 34 of the side air bag inflator 26; and to provide a signal that disables actuation of the side air bag inflator 26 if an occupant is likely within the "at-risk" zone 34 of the side air bag inflator 26. For example, the occupant detection system 10 is adapted to enable actuation of the side air bag inflator 26 for an occupant 36 seated as illustrated in any of FIGS. 2a–d, and the occupant detection system 10 is adapted to disable actuation of the side air bag inflator 26 for an occupant 36 seated as illustrated in any of FIGS. 3a–c.

The first electric field sensor 12 comprises a first electrode 38 located in a region that extends across an upper central region 40 of the seating surface 42 of the seat back 16 of the seat 18 at a height corresponding to an upper boundary of the "at-risk" zone 34 of the side air bag inflator 26, and then extends downwards towards a middle inboard region 44 of the seating surface 42. Accordingly, the first electrode 38 is sensitive to an occupant against the seat back 16 at locations other than within the "at-risk" zone 34 of the associated side air bag inflator 26, so as to enable an occupant positioned as such to be identified. The first electrode 38 is shaped and located so that even small occupants 36 rest against it when they are against the seat back 16 in nearly any position other than leaning to the outboard side 46 of the seat 18.

Figures 3A, 3B, 3C:
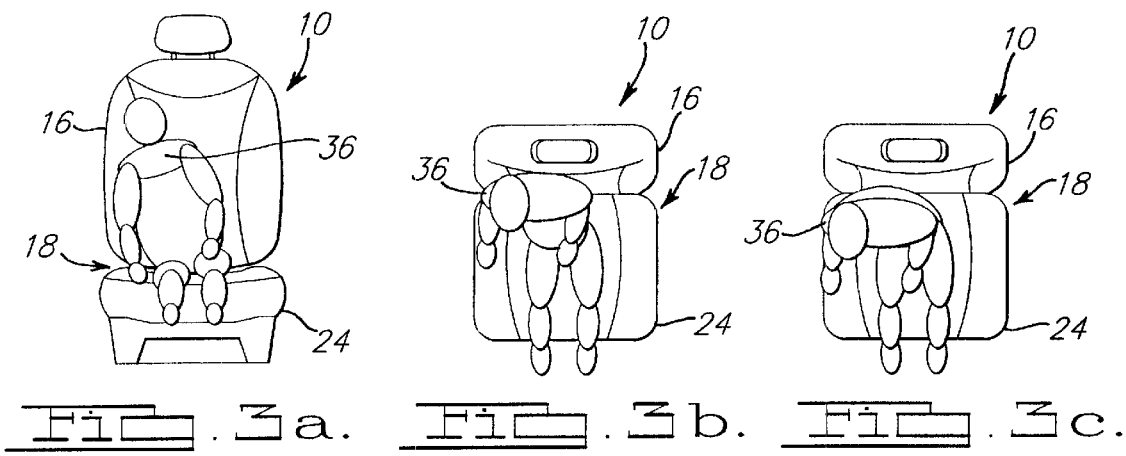
FIGS. 3a–c illustrates examples of various seating configurations for which an associated side air bag inflator would be disabled by the occupant detection system.

The second electric field sensor 14 comprises a second electrode 48 located proximate to the outboard side 46 of the seating surface 42 of the seat back 16 of the seat 18. The second electrode 48 extends along a vertical region corresponding to the extent of the "at-risk" zone 34 of the side air bag inflator 26 adapted to deploy across the outboard side 46 of the seating surface 42 so as to protect the occupant from injury caused by a side-impact crash from the outboard direction. Accordingly, the second electrode 48 is located so as to be sensitive to an occupant leaning against the outboard side 46 of the seat 18 near to the side air bag inflator 26 e.g. as illustrated in FIGS. 3a–c in a position for which a relatively small occupant could be at risk of injury from a deployment thereof.

The seat weight sensor 22, for example, may comprise one or more load cells 50 operatively connected to at least one load path between the seat base 24 and the vehicle 20, e.g. between the seat frame 52 and the floor pan 54 of the vehicle 20, so as to measure the weight of the entire seat 18 and objects or occupants 36 placed thereon. For example, the one or more load cells 50 could use a strain gage, a magnetostrictive sensing element, a force sensitive resistive element, or another type of sensing element to measure the associated load. For example, the seat weight sensor 22 may be constructed in accordance with the teachings of U.S. Pat. Nos. 5,905,210 or 6,069,325, each of which is incorporated herein by reference.

Figure 4:
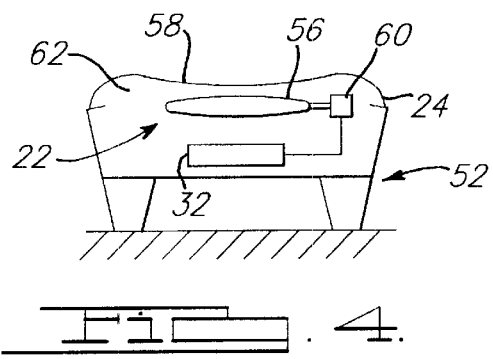
FIG. 4 illustrates a hydrostatic seat weight sensor in a seat base.

The seat weight sensor 22 may alternately comprise at least one weight sensing element, e.g. a force sensitive resistive element, a membrane switch element, or a hydrostatic weight sensing element, operatively connected to one or more seating surfaces in the seat base or seat back, e.g. in accordance with the teachings of U.S. Pat. Nos. 5,918,696, 5,927,427, 5,957,491, 5,979,585, 5,984,349, 5,986,221, 6,021,863, 6,045,155, 6,076,853, 6,109,117 or 6,056,079, each of which is incorporated herein by reference. For example, referring to FIG. 4, the seat weight sensor 22 may comprise a hydrostatic weight sensing element—e.g. a fluid-containing bladder 56, underneath the seat cover 58 of the seat base and supported by the seat frame 52—wherein a pressure sensor 60 operatively connected to the bladder 56 measures the pressure of the fluid contained therein so as to provide a measure of occupant weight. The pressure sensor 60 is operatively connected to the controller 32 so as to provide a pressure signal thereto, which determines a measure of weight therefrom. A seat weight sensor 22 within the cushion 62 of the seat, e.g. in the seat base 24 only, would typically not be as accurate as a seat weight sensor 22 that measures the weight of the entire seat 18, but would still provide information about the weight of an occupant on the seat 18 sufficient for the occupant detection system 10 to control the side air bag inflator 26 responsive thereto. The particular type of seat weight sensor 22 is not considered to be limiting.

Figure 5:
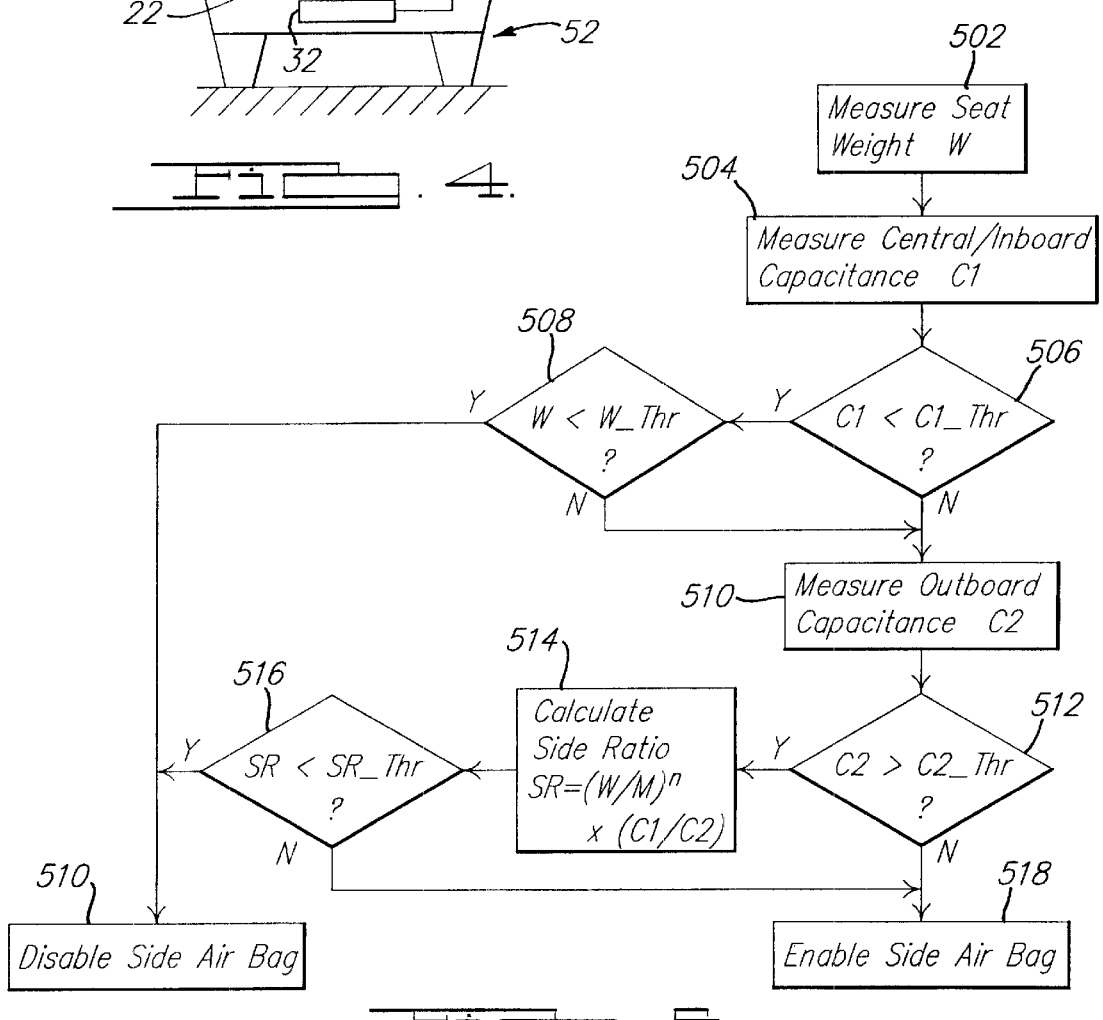
FIG. 5 illustrates a flow chart of a process for detecting an occupant.

Referring to FIG. 5, in accordance with a method of detecting an occupant 36 in step (502) the seat weight sensor 22 provides a measure of seat weight W representative of the weight upon the seat 18. Then, in step (504), the first electric field sensor 12 provides a measure of the central/inboard capacitance C1 of the first electrode 38 relative to ground, i.e. relative to the surroundings.

Then, in step (506), if the central/inboard capacitance C1 is less than an associated central/inboard capacitance threshold $C1^{Thr}$; and, in step (508), if the measure of seat weight W is less than an associated weight threshold $W^{Thr}$, then, in step (510) the side air bag inflator 26 is disabled. For example, the weight threshold $W^{Thr}$ corresponds to a measure of seat weight W from the seat weight sensor 22 corresponding to an occupant weighing about 55 pounds upon the seat 18; and the central/inboard capacitance threshold $C1^{Thr}$ is set to provide for a capacitance change—relative to that of an empty seat—of approximately 1 picofarad for an a first electrode 38 having a minimum dimension of about 1–2 inches (25–50 millimeters). The particular value of the central/inboard capacitance threshold $C1^{Thr}$ is dependent upon the particular geometry of the first electrode 38, but the threshold is adapted so that the measure of the central/inboard capacitance C1 is greater than the central/inboard capacitance threshold $C1^{Thr}$ when the head of a child is proximate to the first electrode 38.

Otherwise, from step (506), or otherwise, from step (508), in step (510), the second electric field sensor 14 provides a measure of the outboard capacitance C2 of the second electrode 48 relative to ground, i.e. to the surroundings. Then, in step (512), if the outboard capacitance C2 is greater than an associated outboard capacitance threshold $C2^{Thr}$, then, in step (514), a side ratio SR (or generally, a control measure) is calculated as follows:

$$SR = \left(\frac{W}{M}\right)^n \cdot \left(\frac{C1}{C2}\right)$$

where W is the measure of seat weight from the seat weight sensor 22, M and n are parameters that control the dependency of the calculated side ratio SR upon the measure of seat weight W, C1 is the measure of the central/inboard capacitance of the first electrode 38, and C2 is the measure of the outboard capacitance of the second electrode 48.

Then, in step (516), if the side ratio SR is less than an associated side ratio threshold $SR^{Thr}$, then, in step (510), the side air bag inflator 26 is disabled.

Otherwise from step (512), or otherwise from step (516), in step (518), the side air bag inflator 26 is enabled for deployment responsive to a signal from the side-impact crash sensor 30.

Whereas FIG. 5 illustrates one embodiment for carrying out a method of detecting an occupant 36, it should be understood that the particular order by which seat weight W, central/inboard capacitance C1 and outboard capacitance C2 are measured, and the side ratio SR is calculated, is not considered to be limiting, provided that the associated calculation or measurements are made prior to when they are used in the decision or calculation steps.

Referring to FIG. 6, the decision logic associated with FIG. 5 is dependent upon four (4) binary valued factors indicated in FIG. 6 by columns labeled A, B, C and D corresponding respectively to steps (516), (512), (506) and (508) in FIG. 5, wherein the side air bag inflator 26 disabled if the logical expression (A AND B) OR (C AND D) evaluates as TRUE, as is indicated by the state of DISABLE in the column entitled Side Air Bag Inflator Control; and the side inflator 26 is enabled if the logical expression (A AND B) OR (C AND D) evaluates as FALSE, as is indicated by the state of ENABLE in the same column. The sixteen (16) possible combinations of four (4) independent binary-valued factors A, B, C and D are tabulated along with the associated outcome in FIG. 6. Several of the combinations are illustrated by FIGS. 2a–d and FIGS. 3a–c, as indicated in the column entitled illustration.

Figure 2A:
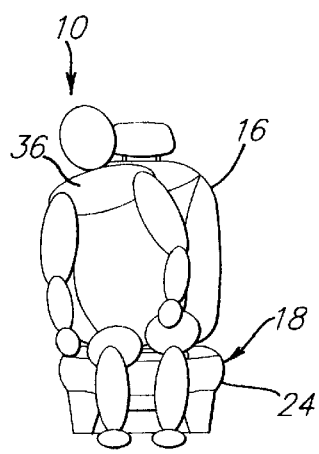
FIGS. 2a–d illustrates examples of various seating configurations for which an associated side air bag inflator would be enabled by the occupant detection system.

For example, FIG. 2a illustrates a first example of a seat occupancy condition that corresponds to combination #3 of FIG. 6, wherein a side air bag inflator 26 is enabled for a relatively large occupant 36 having an associated measure of seat weight W greater than the associated weight threshold $W^{Thr}$ leaning against the seat back 16 towards the outboard side of the seat 18, so that both the measure of central/inboard capacitance C1 and the measure of outboard capacitance C2 are greater than the respective thresholds $C1^{Thr}$ and $C2^{Thr}$. Also, the associated side ratio SR is greater than the side ratio threshold $SR^{Thr}$ because occupant 36 provides a sufficiently large measure of seat weight W; and is positioned so as to be simultaneously proximate to both the first electrode 38 and the second electrode 48 of the first 12 and second 14 electric field sensors.

Figure 2B:
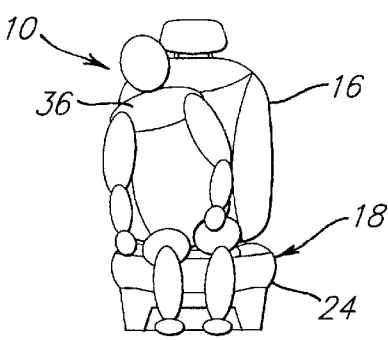

As another example, FIG. 2b illustrates second example of a seat occupancy condition that corresponds to combination #3 of FIG. 6, wherein a side air bag inflator 26 is enabled for a relatively moderate-sized occupant 36 having an associated measure of seat weight W greater than the associated weight threshold $W^{Thr}$—leaning against the seat back 16 towards the outboard side of the seat 18, so that both the measure of central/inboard capacitance C1 and the measure of outboard capacitance C2 are greater than the respective thresholds $C1^{Thr}$ and $C2^{Thr}$. Also, the associated side ratio SR is greater than the side ratio threshold $SR^{Thr}$ because occupant 36 provides a sufficiently large measure of seat weight W; and is positioned so as to be simultaneously proximate to both the first electrode 38 and the second electrode 48 of the first 12 and second 14 electric field sensors.

Generally from FIG. 6, if the occupant 36 has an associated measure of seat weight W greater than the associated weight threshold $W^{Thr}$, then the side air bag inflator 26 is enabled except for conditions #4 and #8 i.e. enabled for six of eight conditions—for which the occupant 36 is sufficiently proximate to the second electrode 48 of the second 14 electric field sensor so that the measure of outboard capacitance C2 is greater than the outboard capacitance threshold $C2^{Thr}$, and the associated side ratio SR is less than the side ratio threshold $SR^{Thr}$ as a result of particular combinations of values of measures of seat weight W, central/inboard capacitance C1 and outboard capacitance C2.

Figure 2C:
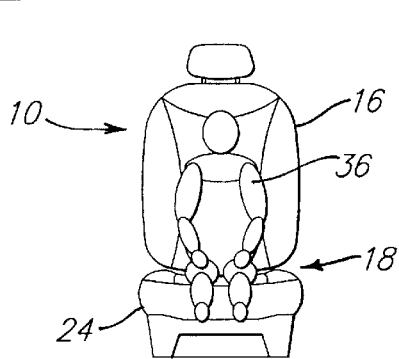

As yet another example, FIG. 2c illustrates a first example of a seat occupancy condition that corresponds to combination #10 of FIG. 6, wherein a side air bag inflator 26 is enabled for a relatively small occupant 36 having an associated measure of seat weight W less than the associated weight threshold $W^{Thr}$ leaning against the seat back 16 proximate to the center of the seat 18, so that the measure of central/inboard capacitance C1 is greater than the associated central/inboard capacitance threshold $C1^{Thr}$ e.g., as a result of the proximity of the occupant's head to the first electrode 38 in the upper central region 40 of the seat back 16—and the measure of outboard capacitance C2 is less than the associated outboard capacitance threshold $C2^{Thr}$ because the occupant 36 is not proximate to the second electrode 48 of the second 14 electric field sensor.

Figure 2D:
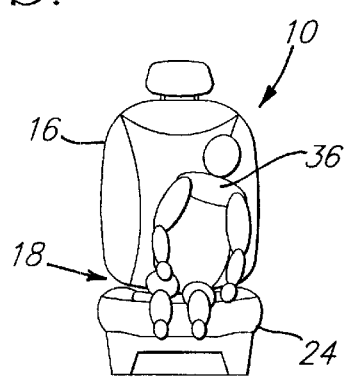

As yet another example, FIG. 2d illustrates a second example of a seat occupancy condition that corresponds to combination #10 of FIG. 6, wherein a side air bag inflator 26 is enabled for a relatively small occupant 36—having an associated measure of seat weight W less than the associated weight threshold $W^{Thr}$ leaning against the seat back 16 towards the inboard side of the seat 18, so that the measure of central/inboard capacitance C1 is greater than the associated central/inboard capacitance threshold $C1^{Thr}$ e.g., as a result of the proximity of the occupant's head or shoulders to the first electrode 38 in the middle inboard region 44 of the seat back 16—and the measure of outboard capacitance C2 is less than the associated outboard capacitance threshold $C2^{Thr}$ because the occupant 36 is not proximate to the second electrode 48 of the second 14 electric field sensor. Accordingly, the first electrode 38 having a first portion thereof in the upper central region 40 of the seat back 16 and a second portion thereof in the middle inboard region 44 of the seat back 16 is adapted to detect a reactively small occupant 36 sitting either upright against the seat back 16, or leaning towards the inboard side of the seat 18, so as to provide for enabling the side air bag inflator 26 for these seating conditions.

As yet another example, FIGS. 3a and 3b illustrate a examples of seat occupancy conditions that correspond to combination #12 of FIG. 6, wherein a side air bag inflator 26 is disabled for a relatively small occupant 36—having an associated measure of seat weight W less than the associated weight threshold $W^{Thr}$ leaning against the seat back 16 towards the outboard side of the seat 18, so that the measure of central/inboard capacitance C1 is less than the associated central/inboard capacitance threshold $C1^{Thr}$ because the occupant 36 is not proximate to the first electrode 38 of the first 12 electric field sensor, —the measure of outboard capacitance C2 is greater than the associated outboard capacitance threshold $C2^{Thr}$ e.g., as a result of the proximity of the occupant's head or shoulders to the second electrode 48 of the second 14 electric field sensor, —and the associated side ratio SR is less than the side ratio threshold $SR^{Thr}$ as a result of the combination of values of measures of seat weight W, central/inboard capacitance C1 and outboard capacitance C2.

As yet another example, FIG. 3c illustrates an example of a seat occupancy condition that corresponds to either combination #13 or combination #14 of FIG. 6, wherein a side air bag inflator 26 is disabled for a relatively small occupant 36—having an associated measure of seat weight W is less than the associated weight threshold $W^{Thr}$ leaning away from the seat back 16 towards the outboard side of the seat 18, so that the measure of central/inboard capacitance C1 is less than the associated central/inboard capacitance threshold $C1^{Thr}$ because the occupant 36 is not proximate to the first electrode 38 of the first 12 electric field sensor, —and the measure of outboard capacitance C2 is less than the associated outboard capacitance threshold $C2^{Thr}$ because the occupant 36 is not proximate to the second electrode 48 of the first 12 electric field sensor, —regardless of the value of the associated side ratio SR.

Generally from FIG. 6, if the occupant 36 has an associated measure of seat weight W less than the associated weight threshold $W^{Thr}$, then the side air bag inflator 26 is disabled except for conditions #9, #10 and #11 i.e. disabled for five of eight conditions. The side air bag inflator 26 is enabled when the occupant 36 is sufficiently proximate to the first electrode 38 of the first 12 electric field sensor so that the measure of central/inboard capacitance C1 is greater than the central/inboard capacitance.threshold $C1^{Thr}$ except for when the occupant is also sufficiently proximate to the second electrode 48 of the second 14 electric field sensor so that the measure of outboard capacitance C2 is greater than the outboard capacitance threshold $C2^{Thr}$, and the associated side ratio SR is less than the side ratio threshold $SR^{Thr}$ as a result of the combination of values of measures of seat weight W, central/inboard capacitance C1 and outboard capacitance C2. Accordingly, the side air bag inflator 26 is disabled for a relatively small occupant 36 when the occupant 36 is positioned so that their head could be within the "at-risk" zone 34 of the side air bag inflator 26.

As illustrated by combinations #13 and #14 of FIG. 6, the side air bag inflator 26 is also disabled when the seat is empty, for which condition the measure of seat weight W is less than the associated weight threshold $W^{Thr}$, and both the measure of central/inboard capacitance C1 and the measure of outboard capacitance C2 are less than the respective thresholds $C1^{Thr}$ and $C2^{Thr}$. Moreover, the empty seat condition can be detected by comparing the measures of seat weight W, central/inboard capacitance C1 and outboard capacitance C2 with a corresponding set of reference measures that are stored in memory, wherein if the difference therebetween is less than a threshold, then the seat is assumed to be empty, and the side air bag inflator 26 is disabled from actuation responsive to a crash detected by the side-impact crash sensor 30.

The control logic of FIGS. 5 and 6 provides for disabling the side air bag when a child is not against the seat back, but does have their head in the path of the air bag from the side air bag inflator 26, near to the associated passenger door 28. The measure of seat weight Wand the measures of central/ inboard capacitance C1 and outboard capacitance C2 provide for disabling the side air bag inflator 26 when a child is present, under conditions when the side air bag inflator 26 would otherwise need to be enabled if a slightly forward leaning adult were present.

As used herein, the term "electric field sensor" refers to a sensor that generates a signal responsive to the influence of that being sensed, upon an electric field. Generally, an electric field sensor comprises an electrode to which is applied an applied signal; and an electrode which could be the same electrode or electrodes to which the applied signal is applied at which a received signal (or response) is measured. The applied signal generates an electric field from the electrode to a ground in the environment of the electrode, or to another electrode. The applied and received signals may be associated with the same electrode or electrodes, or with different electrodes. The particular electric field associated with a given electrode or set of electrodes is dependent upon the nature and geometry of the electrode or set of electrodes and upon the nature of the surroundings thereto, for example the dielectric properties of the surroundings. For a fixed electrode geometry, the received signal or signals of an electric field sensor are responsive to the applied signal or signals and to the nature of the environment influencing the resulting electric field, for example to the presence and location of an object with a permittivity or conductivity different to that of its surroundings.

One form of electric field sensor is a capacitive sensor, wherein the capacitance of one or more electrodes is measured from the relationship between received an applied signals for a given electrode configuration. The technical paper "Field mice: Extracting hand geometry from electric field measurements" by J. R. Smith, published in IBM Systems journal, Vol. 35, Nos. 3 & 4, 1996, pp. 587–608, incorporated herein by reference, describes the concept of electric field sensing as used for making non-contact three-dimensional position measurements, and more particularly for sensing the position of a human hand for purposes of providing three dimensional positional inputs to a computer. What has commonly been referred to as capacitive sensing actually comprises the distinct mechanisms of what the author refers to as "loading mode", "shunt mode", and "transmit mode" which correspond to various possible electric current pathways. In the shunt mode, a voltage oscillating at low frequency is applied to a transmit electrode, and the displacement current induced at a receive electrode is measured with a current amplifier, whereby the displacement current may be modified by the body being sensed. In the "loading mode", the object to be sensed modifies the capacitance of a transmit electrode relative to ground. In the transmit mode, the transmit electrode is put in contact with the user's body, which then becomes a transmitter relative to a receiver, either by direct electrical connection or via capacitive coupling.

The capacitance of an electric field sensor can be also measured by other means of measuring capacitance, as for example given in *The Standard Handbook for Electrical Engineers* $12^{th}$ edition, D. G. Fink and H. W. Beaty editors, McGraw Hill, 1987, pp. 3-57 through 3-65 or in Reference Data for Engineers: Radio, Electronics, Computer, and Communications $7^{th}$ edition, E. C. Jordon editor in chief, Howard W. Sams, 1985, pp. 12-3 through 12-12, both included herein by reference.

Accordingly, the first 12 and second 14 electric field sensor are each either what is commonly known as a capacitive sensor, or more generally an electric field sensor operating in any of the above described modes.

The temperature range that is possible in an automotive environment can potentially adversely affect the sensing circuit associated with the electric field sensor, causing a drift in the "perceived" sensor reading. One way to combat this drift is to use a reference capacitor that can be switched into the measurement circuit in place of the sensing electrode. Because the reference capacitor can be selected such that its value is relatively stable over temperature, drift can be identified and this information can be used to alter a decision threshold. An alternative scheme is to always measure the difference between a reference capacitor and the sensor capacitance. A second "calibration" capacitor can then be switched in to take the place of the sensor to identify the measurement system gain. Using a reference capacitor and a calibration capacitor allows the system to continuously compensate for variations in the measurement circuit. Rather than attempting to measure the temperature and then make a correction, the reference and calibration capacitor are used to measure the current offset and gain of the measurement circuitry so that measurements are always consistent. Switching between the reference capacitor, the calibration capacitor, or a sensor can be done using a combination of FET's or an analog demultiplexor such as a CD4051 from Texas Instruments.

Figure 7:
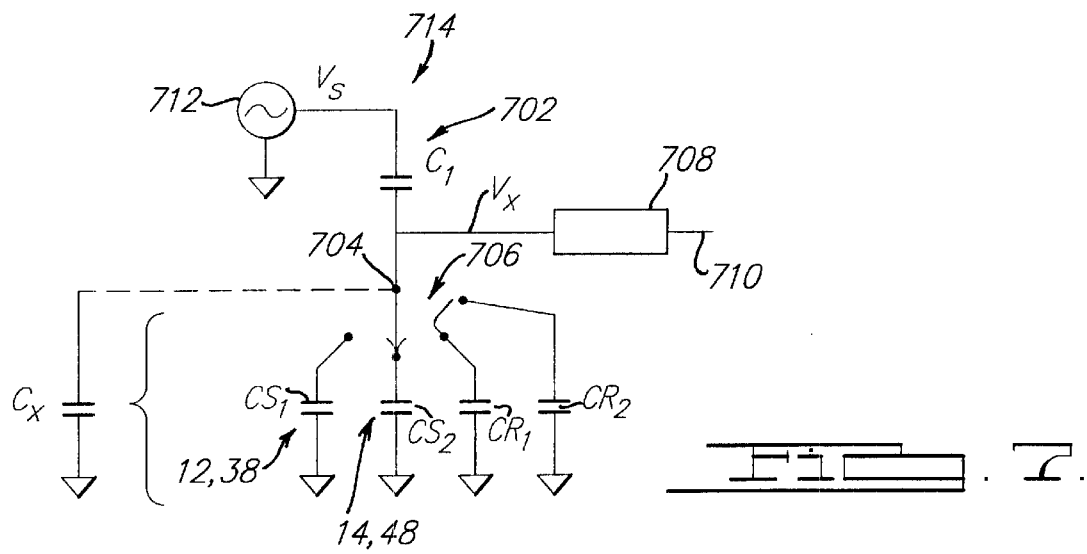
FIG. 7 illustrates a generalized sensing circuit for measuring a capacitance.

Referring to FIG. 7, one technique for measuring a capacitance $C_X$ is to measure the voltage from a capacitive voltage divider 702 comprising a known capacitance $C_1$ in series with the capacitance $C_X$ to be measured, wherein an oscillating voltage source $V_S$ is applied across the capacitive voltage divider 702 and a voltage $V_X$ responsive to the capacitance $C_X$ is measured at the junction 704 of the capacitive voltage divider 702 between the known capacitance $C_1$ and the capacitance $C_X$ to be measured. For both the known capacitance $C_1$ and the capacitance $C_X$ to be measured represented as pure capacitances, for purposes of illustration, the voltage $V_X$ is given by:

$$V_X = V_S \cdot \left( \frac{C_1}{C_1 + C_X} \right)$$

Accordingly, if both $C_1$ and $V_S$ are known, then $C_X$ can be determined from $V_X$ However, as described above, $V_S$, $C_1$ or the associated circuitry may subject to drift over time or as a result of environmental conditions, or subject to system-to-system variation. The affects of this drift or variation are compensated by repetitively switching the capacitance $C_X$ to be measured from the unknown capacitance of an electric field sensor to the known capacitance of one or more temperature stable reference capacitors, wherein the repetitive switching process is cycled sufficiently quickly so that that drift or variation over the measurement cycle is negligible. For example, as illustrated in FIG. 7, one or more various capacitances are switched into the capacitive voltage divider 702 as capacitance $C_X$ by a switching element 706. For example, as a first step, the switching element 706 connects the first electrode 38 of the first electric field sensor 12 having a capacitance $CS_1$ to the junction 704 of the capacitive voltage divider 702 as capacitance $C_X$ and a corresponding voltage $VS_1$ is measured as $V_X$. Then, as a second step, the switching element 706 connects a first reference capacitor $CR_1$ to the junction 704 of the capacitive voltage divider 702 as capacitance $C_X$ and a corresponding voltage $VR_1$ is measured as $V_X$. Then, as a third step, the switching element 706 adds a second reference capacitor $CR_2$ to the junction 704 of the capacitive voltage divider 702 so that the capacitance $C_X$ is given by the sum ($CR_1+CR_2$), and a corresponding voltage $VR_{12}$ is measured as $V_X$ The period of time between the first and third steps is sufficiently short for there to be negligible drift in the measurement of $V_X$ over that period of time. The three voltage measurements can then be used to provide a measure of the capacitance $CS_1$ of the first electrode 38 of the first electric field sensor 12—independent of $V_S$ or $C_1$—as follows:

$$CS_1 = CR_1 + CR_2 \cdot \left( \frac{1 - \frac{VR_1}{VS_1}}{1 - \frac{VR_1}{VR_{12}}} \right)$$

The capacitance of the second electrode 48 of the second electric field sensor 14 is measured by repeating the above three step process, except for connecting the second electrode 48 instead of the first electrode 38 during the first step.

Accordingly, the first electric field sensor 12 comprises a first electrode 38 operatively connected to an applied signal $V_S$ thorough a capacitive voltage divider 702 so as to generate an electric field proximate to the first electrode 38 responsive to a voltage $V_X$ on the first electrode 38. The applied signal $V_S$, for example, comprises an oscillating signal. The first electrode 38 is operatively connected to a receiver 708 which outputs a received signal 710 responsive to the electric field at the corresponding first electrode 38, wherein the received signal 710 is responsive to at least one electric-field-influencing property for example dielectric constant, conductivity, size, mass or distance—of an object proximate to the first electric field sensor 12. For example, for the first electric field sensor 12 as a capacitance sensor, the receiver 708 provides a measure of the capacitance of the first electrode 38 with respect to a surrounding ground. The applied signal $V_S$ is, for example, generated by an oscillator 712 incorporated in a sensing circuit 714 that also incorporates the receiver 708.

Similarly, the second electric field sensor 14 comprises a second electrode 48 operatively connected to the applied signal $V_S$ thorough a capacitive voltage divider 702 so as to generate an electric field proximate to the second electrode 48 responsive to a voltage $V_X$ on the second electrode 48. The second electrode 48 is operatively connected to a receiver 708 which outputs a received signal 710 responsive to the electric field at the corresponding second electrode 48, wherein the received signal 710 is responsive to at least one electric-field-influencing property for example dielectric constant, conductivity, size, mass or distance—of an object proximate to the second electric field sensor 14. For example, for the second electric field sensor 14 as a capacitance sensor, the receiver 708 provides a measure of the capacitance of the second electrode 48 with respect to a surrounding ground.

The sensor measurements can be made by a single sensing circuit 714 that incorporates a switching element 706 to operatively couple either the first electrode. 38 or the second electrode 48 to a common oscillator 712 and receiver 708 for generating the respective measures of capacitance $CS_1$, $CS_2$.

The capacitance of the first electrode 38 or the second electrode 48 relative to ground is relatively small, for example less than about 50 picofarads. The temperature range that is possible in an automotive environment can significantly affect the components of the sensing circuit 714, causing drift that could be erroneously interpreted as a measurement that would cause the side air bag inflator 26 to be erroneously enabled by the controller 32. The affects of this drift can be mitigated by incorporating a temperature stable reference capacitor in the sensing circuit 714 that is switched in place of either the first 38 or second 48 electrode so as to provide a means for making comparative capacitive measurements.

Referring to FIG. 8, illustrating an exemplary sensing circuit 714, an oscillator 802 generates an oscillating signal, for example a sinusoidal signal, that is filtered by a first bandpass filter 804 so as to create a first oscillating signal 806. The first oscillating signal 806 is applied to a capacitive voltage divider 808 comprising capacitor $C_1$, resistors $R_1$ and $R_2$, and one or more capacitive elements to be measured, selected from a first electrode 38, a second electrode 48, a first reference capacitor $C_{R1}$, and a second reference capacitor $C_{R2}$, wherein the capacitive elements to be measured are included or excluded responsive to the states of respective FET switches $Q_{1a}$, $Q_{1b}$, $Q_{2a}$, $Q_{2b}$, $Q_{3a}$, $Q_{3b}$, $Q_{4a}$ and $Q_{4b}$. Capacitor $C_1$, resistors $R_1$ and $R_2$, and the FET switches $Q_{1a}$, $Q_{2a}$, $Q_{3a}$ and $Q_{4a}$—that when active switch in the respective capacitive elements to be measured—are all connected to one another at a first node 810, which is connected to the input 812 of a voltage follower $U_1$. The output 814 of the voltage follower $U_1$ is connected to FET switches $Q_{1b}$, $Q_{2b}$, $Q_{3b}$ and $Q_{4b}$ that when active, switch out the respective capacitive elements so as to not be measured. The activation of the FET switch elements of FET switch pairs $Q_{1a}$ and $Q_{1b}$, $Q_{2a}$ and $Q_{2b}$, $Q_{3a}$ and $Q_{3b}$ and $Q_{4a}$ and $Q_{4b}$ are respectively mutually exclusive. For example if FET switch $Q_{1a}$ is activated or closed, then FET switch $Q_{1b}$ is deactivated or open. A capacitive element being measured adds to the capacitance at the first node, thereby affecting the strength of the signal at the input 812 to the voltage follower $U_1$. A capacitive element not being measured is disconnected from the first node by its respective first FET switch element, and connected to the output 814 of the voltage follower $U_1$ by its respective second FET switch element, wherein, in accordance with the characteristics of the associated operational amplifier of the voltage follower $U_1$, the output 814 of the voltage follower $U_1$ follows the signal of the first node without that respective capacitive element connected, and voltage follower $U_1$ provides a current through the associated capacitive element through the second respective FET switch element. Moreover, when the respective second FET switch element is activated, the source and drain of the respective first FET switch element are separately coupled to the respective operational amplifier inputs, so that to each is applied the same potential, thereby eliminating the effect of the capacitance of the respective first FET switch on the capacitance measurement.

The output 814 of the voltage follower $U_1$ is then coupled to a second bandpass filter 816 of the same pass band as the first bandpass filter 804, the output of which is detected by a detector 818 comprising diode $D_1$ resistor R3 and capacitor $C_2$, and filtered by a first low pass filter 820. The output 822 of the first low pass filter 820 has a DC component corresponding to the capacitance at the first node 810. This DC component is filtered by blocking capacitor $C_3$, and the resulting signal is filtered by a second low pass filter 824 to provide the amplitude 826 of the oscillating signal at the first node 810, which is related to the total capacitance at that location. The blocking capacitor $C_3$ is adapted so as to provide for a transitory measurement of the amplitude 826.

In operation, a microprocessor $U_2$ controls the activation of FET switches $Q_{1a}$, $Q_{1b}$, $Q_{2a}$, $Q_{2b}$, $Q_{3a}$, $Q_{3b}$, $Q_{4a}$ and $Q_{4b}$, for example in accordance with the control logic illustrated in FIG. 9. With the first reference capacitor $C_{R1}$ switched in by microprocessor $U_2$ i.e. with $Q_{2a}$ activated and $Q_{2b}$ deactivated, the controller measures a first amplitude. Then with the second reference capacitor $C_{R2}$ also switched in by microprocessor $U_2$, a second amplitude is measured corresponding to an incremental increase of capacitance at the first node by the capacitance of capacitor $C_{R2}$. Then a sensitivity factor is computed in Volts/picofarad given the known values of capacitance of capacitors $C_{R1}$ and $C_{R2}$ as described hereinabove with reference to FIG. 7. Then, the microprocessor $U_2$ switches out the first $C_{R1}$ and second reference capacitor $C_{R2}$, switches in either the first 38 or second 48 electrode, measures a third amplitude, and calculates the capacitance of either the first 38 or second 48 electrode depending upon which is being measured—using the calculated sensitivity factor.

A control circuit 828 uses the measures of capacitance for the first 12 and second 14 electric field sensors and the measure of weight W from the seat weight sensor 22—in accordance with the steps illustrated in FIG. 5 and the logic of FIG. 6—to control whether or not the side air bag inflator 26 is enabled responsive to a crash detected by the side-impact crash sensor 30. Whereas FIG. 8 illustrates the microprocessor $U_2$ and control circuit 828 as separate elements, alternate arrangements are possible. For example, both may be combined in one controller, or the microprocessor may be adapted to sense the amplitude measurements, calculate the capacitance of the first 12 and second 14 electric field sensors, and then output these capacitance values to the control circuit 828.

The first electrode 38 and the second electrode 48 may be each modeled as a first capacitance $C_{S1}$ in parallel with a series combination of a second capacitance $C_{S2}$ and a resistance $R_S$, wherein the resistance $R_S$ is inversely related to the wetness of the seat. The capacitance of the capacitive sensor is dominated by $C_{S1}$ for a dry seat, but becomes affected by $C_{S2}$ and $R_S$ as the wetness of the seat increases.

The values of capacitance for capacitors $C_1$, $C_{R1}$, and $C_{R2}$ may be adapted to maximize the dynamic range of the capacitance measurement over the range of expected capacitances of the first 12 and second 14 electric field sensors.

Figure 10:
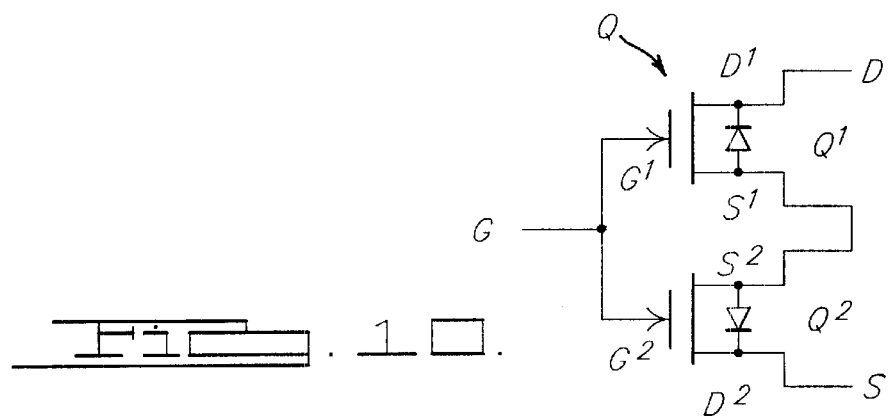
FIG. 10 illustrates an alternate FET switch embodiment.

Referring to FIG. 10, each FET switch $Q_{1a}$, $Q_{1b}$, $Q_{2a}$, $Q_{2b}$, $Q_{3a}$, $Q_{3b}$, $Q_{4a}$ or $Q_{4b}$ may be replaced by a pair of FET switches $Q^1$ and $Q^2$. Designating the terminals of the original FET switch Q as G, S and D for the gate, source and drain respectively, these terminals are mapped to the terminals of the pair of FET switches $Q^1$ and $Q^2$ as follows: 1) the respective gates $G^1$ and $G^2$ are connected together and are mapped to G; 2) the sources $S^1$ and $S^2$ are connected together; 3) the drain $D^1$ of FET switch $Q^1$ is mapped to D; and 4) the drain $D^2$ of FET switch $Q^2$ is mapped to S. This arrangement is beneficial for three-pin FET switches for which the source is connected to the body, thereby effectively creating a diode junction between the source and drain, as is illustrated in FIG. 10. With the sources $S^1$, $S^2$ interconnected, these effective diode junctions are placed back-to-back in series with opposing polarities, so as to prevent the passage of a signal without being under control of the respective gates $G^1$, $G^2$. Furthermore, the drain-source capacitance of the pair of FET switches $Q^1$ and $Q^2$ is half that of one FET switch $Q^1$, because the respective capacitances are connected in series.

FIG. 11 illustrates several other embodiments for various aspects of the sensing circuit 714. For example, the elements to be sensed at the first node 810 may be coupled via an analog demultiplexor 1102, such as a CD4051 from Texas Instruments, wherein under control of the microprocessor $U_2$, the elements to be sensed are coupled, one element at a time, to the first node 810 by the analog demultiplexor 1102. For example, first $C_{R1a}$ and second $C_{R2a}$ reference capacitors and a capacitive sensor are each operatively connected to distinct analog inputs of the analog demultiplexor 1102, and are operatively connected mutually exclusively—to the first node 810 by the analog demultiplexor 1102. Accordingly, with this arrangement, the calibration process differs from that illustrated in FIGS. 10a–b for which two reference capacitors can be simultaneously operatively connected to the first node 810. A plurality of analog demultiplexors 1102 may be used if more analog channels are required, in which case a separate set of reference capacitors, for example $C_{R1b}$ and $C_{R2b}$, may be used with each separate analog demultiplexor 1102 to compensate for variations amongst the various analog demultiplexors 1102. As another example of another embodiment, an inductor $L_1$ may be placed between the first node 810 and the elements to be sensed in order to reduce the effects of electromagnetic interference. As yet another example of another embodiment, a D/A converter 1104 under control of the microprocessor $U_2$ may be used to cancel offsets in the associated amplitude signal, wherein the output from the D/A converter 1104 is operatively connected to an inverting amplifier 1106, and is subtracted from the filtered detected amplitude signal 1108. By canceling the offset in the amplitude signal, the associated circuit gain can be increased so as to increase the dynamic range of the amplitude signal. As yet another example of another embodiment, a super diode detection circuit 1110 may be used for detecting the signal amplitude.

Figure 12:
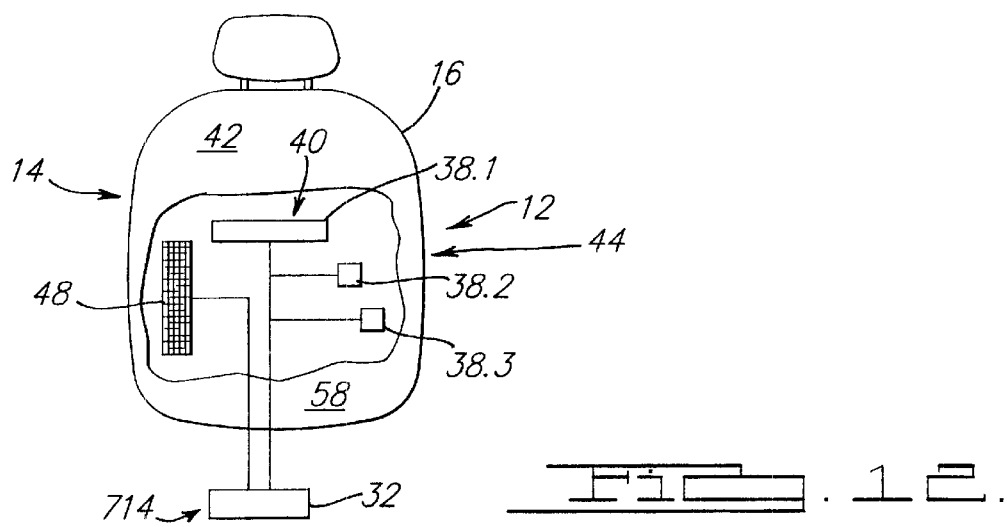
FIG. 12 illustrates an electric field sensor comprising a plurality of electrodes.

Referring to FIGS. 12 and 1, the first 38 and second 48 electrodes can, for example, be located underneath the seat cover 58 of the seating surface 42 of the seat back 16. The first 38 and second 48 electrodes can, for example, be constructed of a variety of conductive materials including metals and plastics in the form of a plate, foil, mesh or weave. Moreover, referring to FIG. 12, either the first 38 or second 48 electrode may comprise a plurality of electrode elements that are either connected together to a common input of the sensing circuit 714, or individually connected to separate sensor ports of the sensing circuit 714. For example, FIG. 12 illustrates the first electrode 38 as a plurality of three electrodes 38.1, 38.2 and 38.3 that are distributed across the upper central region 40 and the middle inboard region 44 of the seat back 16, and that are connected to a common input of the sensing circuit 714. When a plurality of electrode elements corresponding to either the first 38 or second 48 electrode are connected to separate sensor ports of the sensing circuit 714, the sensing circuit 714 then provides for separate associated measures of capacitance which are then summed to provide a corresponding total capacitance C1 or C2 of associated first 38 or second 48 electrode.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

What is claimed is:

1. A method of providing for detecting an occupant in a seat of a vehicle, comprising:

a. providing for sensing a first measure of capacitance of a first electrode, wherein said first measure of capacitance provides for the detection of the occupant in the seat, wherein said first electrode comprises a first portion located proximate to an upper central region of a seating surface of a seat back of said seat, and a second portion located proximate-to an inboard side of said seating surface, wherein said second portion is below said first portion; and b. providing for controlling an actuation of a safety restraint actuator responsive to said first measure of capacitance.

2. A method of providing for detecting an occupant in a seat of a vehicle as recited in claim 1, further comprising:

a. providing for sensing a second measure of capacitance of a second electrode, wherein said second electrode is located proximate to an outboard side of said seating surface; and b. providing for controlling an actuation of a safety restraint actuator responsive to said second measure of capacitance.

3. A method of providing for detecting an occupant in a seat of a vehicle as recited in claim 2, wherein said safety restraint actuator is enabled if said first measure of capacitance is greater than a first threshold and if said second measure of capacitance is less than a second threshold.

4. A method of providing for detecting an occupant in a seat of a vehicle as recited in claim 1, wherein said safety restraint actuator comprises an air bag inflator that is adapted to deploy an air bag proximate to said outboard side of said seating surface when said seat is installed in the vehicle.

5. A method of providing for detecting an occupant in a seat of a vehicle as recited in claim 4, wherein said upper central region is located proximate to an upper bound of a region of space occupied by said air bag when said air bag is deployed.

6. A method of providing for detecting an occupant in a seat of a vehicle as recited in claim 1, wherein said upper central region is located proximate to the head of a child-sized occupant, wherein said child-sized occupant has a weight that is less than a third threshold.

7. A method of providing for detecting an occupant in a seat of a vehicle as recited in claim 1, further comprising:
   a. providing for sensing a measure of weight upon said seat; and
   b. providing for controlling an actuation of said safety restraint actuator responsive to said measure of weight.

8. A method of providing for detecting an occupant in a seat of a vehicle as recited in claim 7, wherein said safety restraint actuator is disabled if said measure of weight is less than a third threshold and said first measure of capacitance is less than a first threshold.

9. A method of providing for detecting an occupant in a seat of a vehicle as recited in claim 2, further comprising:
   a. providing for sensing a measure of weight upon said seat; and
   b. providing for controlling an actuation of said safety restraint actuator responsive to said measure of weight.

10. A method of providing for detecting an occupant in a seat of a vehicle as recited in claim 9, further comprising:
    a. providing for calculating a control measure responsive to said measure of weight, said first measure of capacitance, and said second measure of capacitance; and
    b. providing for controlling an actuation of said safety restraint actuator responsive to said control measure.

11. A method of providing for detecting an occupant in a seat of a vehicle as recited in claim 10, wherein said control measure comprises a product of a first factor and a second factor, wherein said first factor comprises a ratio of said first measure of capacitance divided by said second measure of capacitance, and said second factor comprises a power of a scaled value of said measure of weight.

12. A method of providing for detecting an occupant in a seat of a vehicle as recited in claim 11, wherein said safety restraint actuator is disabled if said first measure of capacitance is greater than a first threshold, said second measure of capacitance is greater than a second threshold, and said control measure is less than a fourth threshold.

13. A method of providing for detecting an occupant in a seat of a vehicle as recited in claim 11, wherein said safety restraint actuator is enabled if said first measure of capacitance is greater than a first threshold, said second measure of capacitance is greater than a second threshold, and said control measure is greater than a fourth threshold.

14. A system for detecting an occupant in a seat of a vehicle, comprising:
    a. a first electrode, wherein said first electrode comprises a first portion located proximate to an upper central region of a seating surface of a seat back of said seat, and a second portion located proximate to an inboard side of said seating surface, wherein said second portion is below said first portion;
    b. a sensing circuit operatively connected to said first electrode, wherein said sensing circuit applies a first signal to said first electrode and senses a first response to said first signal from said first electrode, wherein said first response is responsive to a capacitance of said first electrode; and
    c. a controller operatively connected to said sensing circuit, wherein said controller generates a control signal responsive to said first response for controlling an actuation of a safety restraint actuator, wherein said first response is responsive to the occupant in said seat.

15. A system for detecting an occupant in a seat of a vehicle as recited in claim 14, wherein said first signal is selected from a first oscillating voltage and a first oscillating current, and said first response is selected from a first oscillating current and a first oscillating voltage.

16. A system for detecting an occupant in a seat of a vehicle as recited in claim 14, wherein said first electrode comprises a plurality of electrode elements.

17. A system for detecting an occupant in a seat of a vehicle as recited in claim 16, wherein each of said electrode elements are operatively connected to one another.

18. A system for detecting an occupant in a seat of a vehicle as recited in claim 16, wherein at least two of said electrode elements are separately connected to said sensing circuit, said sensing circuit provides for generating separate responses from separate electrode elements, and said separate responses are combined to provide a composite measure of capacitance of said first electrode.

19. A system for detecting an occupant in a seat of a vehicle as recited in claim 14, further comprising a second electrode, wherein said second electrode is located proximate to an outboard side of said seating surface, said sensing circuit is operatively connected to said second electrode, and said sensing circuit applies a second signal to said second electrode, and senses a second response to said first signal from said second electrode, wherein said second response is responsive to a capacitance of said second electrode, and said control signal is further responsive to said second response.

20. A system for detecting an occupant in a seat of a vehicle as recited in claim 19 wherein said second signal is selected from a second oscillating voltage and a second oscillating current, and said second response is selected from a second oscillating current and a second oscillating voltage.

21. A system for detecting an occupant in a seat of a vehicle as recited in claim 14, further comprising a weight sensor operatively connected to a seat base of said seat, wherein said weight sensor is responsive to a weight of an object upon said seat base when said object is placed on said seat base, and said control signal is further responsive to a signal from said weight sensor.

* * * * *

UNITED STATES PATENT AND TRADEMARK OFFICE
CERTIFICATE OF CORRECTION

PATENT NO. : 6,609,055 B2
DATED : August 19, 2003
INVENTOR(S) : James G. Stanley It is certified that error appears in the above-identified patent and that said Letters Patent is hereby corrected as shown below:

Title page,
Item [56], References Cited, U.S. PATENT DOCUMENTS, add the following:

| | | | | |
|---|---|---|---|---|
| 3,439,358 | A | 4/1969 | Salmons | 340/552 |
| 3,740,567 | A | 6/1973 | Atkins | 307/10 SB |
| 3,898,472 | A | 8/1975 | Long | 307/10 SB |
| 3,943,376 | A | 3/1976 | Long | 307/116 |
| 4,796,013 | A | 1/1989 | Yasuda et al. | 340/562 |
| 4,887,024 | A | 12/1989 | Sugiyama et al. | 324/674 |
| 4,980,519 | A | 12/1990 | Mathews | 178/19 |
| 5,074,583 | A | 12/1991 | Fujita et al. | 280/735 |
| 5,161,820 | A | 11/1992 | Vollmer | 280/730 |
| 5,164,709 | A | 11/1992 | Lamberty et al. | 340/667 |
| 5,166,679 | A | 11/1992 | Vranish et al. | 340/870.37 |
| 5,214,388 | A | 5/1993 | Vranish et al. | 324/683 |
| 5,232,243 | A | 8/1993 | Blackburn et al. | 280/732 |
| 5,247,261 | A | 9/1993 | Gershenfeld | 324/716 |
| 5,247,281 | A | 9/1993 | Facon et al. | 340/562 |
| 5,363,051 | A | 11/1994 | Jenstrom et al. | 324/661 |
| 5,373,245 | A | 12/1994 | Vranish | 324/662 |
| 5,398,185 | A | 3/1995 | Omura | 364/424.05 |
| 5,411,289 | A | 5/1995 | Smith et al. | 280/735 |
| 5,413,378 | A | 5/1995 | Steffens, Jr. et al. | 280/735 |
| 5,439,249 | A | 8/1995 | Steffens, Jr. et al. | 280/735 |
| 5,442,347 | A | 8/1995 | Vranish | 340/870.37 |
| 5,446,391 | A | 8/1995 | Aoki et al. | 324/661 |
| 5,454,591 | A | 10/1995 | Mazur et al. | 280/735 |
| 5,474,327 | A | 12/1995 | Schousek | 280/735 |
| 5,482,314 | A | 1/1996 | Corrado et al. | 280/735 |
| 5,494,311 | A | 2/1996 | Blackburn et al. | 280/735 |
| 5,525,843 | A | 6/1996 | Howing | 307/9.1 |
| 5,528,698 | A | 6/1996 | Kamei | 382/100 |
| 5,531,472 | A | 7/1996 | Semchena et al. | 280/735 |
| 5,539,292 | A | 7/1996 | Vranish | 318/568.21 |
| 5,570,903 | A | 11/1996 | Meister et al. | 280/735 |
| 5,573,269 | A | 11/1996 | Gentry et al. | 280/735 |
| 5,602,734 | A | 2/1997 | Kithil | 364/424.055 |
| 5,612,876 | A | 3/1997 | Zeidler et al. | 364/424.055 |
| 5,618,056 | A | 4/1997 | Schoos et al. | 280/735 |
| 5,624,132 | A | 4/1997 | Blackburn et al. | 280/735 |
| 5,626,359 | A | 5/1997 | Steffens, Jr. et al. | 280/735 |
| 5,654,643 | A | 8/1997 | Bechtel et al. | 324/687 |
| 5,691,693 | A | 11/1997 | Kithil | 340/439 |
| 5,722,686 | A | 3/1998 | Blackburn et al. | 280/735 |

UNITED STATES PATENT AND TRADEMARK OFFICE
CERTIFICATE OF CORRECTION

PATENT NO. : 6,609,055 B2
DATED : August 19, 2003
INVENTOR(S) : James G. Stanley It is certified that error appears in the above-identified patent and that said Letters Patent is hereby corrected as shown below:

Title page (cont'd),

| | | | | |
|---|---|---|---|---|
| 5,724,024 | A | 3/1998 | Sonderegger et al. | 340/562 |
| 5,726,581 | A | 3/1998 | Vranish | 324/688 |
| 5,730,165 | A | 3/1998 | Philipp | 137/1 |
| 5,732,375 | A | 3/1998 | Cashler | 701/45 |
| 5,748,473 | A | 5/1998 | Breed et al. | 364/424.055 |
| 5,770,997 | A | 6/1998 | Kleinberg et al. | 280/235 |
| 5,793,176 | A | 8/1998 | Novak | 318/587 |
| 5,802,479 | A | 9/1998 | Kithill et al. | 701/45 |
| 5,822,707 | A | 10/1998 | Breed et al. | 701/49 |
| 5,844,415 | A | 12/1998 | Gershenfeld et al. | 324/663 |
| 5,844,486 | A | 12/1998 | Kithil et al. | 340/573 |
| 5,848,661 | A | 12/1998 | Fu | 180/273 |
| 5,864,295 | A | 1/1999 | Jarocha | 340/667 |
| 5,871,232 | A | 2/1999 | White | 280/735 |
| 5,890,085 | A | 3/1999 | Corrado et al. | 701/47 |
| 5,914,610 | A | 6/1999 | Gershenfeld et al. | 324/663 |
| 5,948,031 | A | 9/1999 | Jinno et al. | 701/45 |
| 5,964,478 | A | 10/1999 | Stanley et al. | 280/735 |
| 6,012,007 | A | 1/2000 | Fortune et al. | 701/45 |
| 6,014,602 | A | 1/2000 | Kithil et al. | 701/45 |
| 6,024,378 | A | 2/2000 | Fu | 280/735 |
| 6,043,736 | A | 3/2000 | Sawahata et al. | 340/438 |
| 6,066,954 | A | 5/2000 | Gershenfeld et al. | 324/671 |
| 6,069,325 | A | 5/2000 | Aoki | 177/136 |
| 6,079,738 | A | 6/2000 | Lotito et al. | 280/735 |
| 6,094,610 | A | 7/2000 | Steffens, Jr. et al. | 701/45 |
| 6,135,494 | A | 10/2000 | Lotito et al. | 280/731 |
| 6,158,768 | A | 12/2000 | Steffens, Jr. et al. | 280/735 |
| 6,161,070 | A | 12/2000 | Jinno et al. | 701/45 |
| 6,186,538 | B1 | 2/2001 | Hamada et al. | 280/735 |
| 6,199,902 | B1 | 3/2001 | Cooper et al. | 280/735 |
| 6,208,249 | B1 | 3/2001 | Saito et al. | 340/561 |
| 6,224,095 | B1 | 5/2001 | Schifflechner | 280/735 |
| 6,242,701 | B1 | 6/2001 | Breed et al. | 177/144 |
| 6,250,671 | B1 | 6/2001 | Osmer et al. | 280/735 |
| 6,253,133 | B1 | 6/2001 | Sakai et al. | 701/45 |
| 6,263,271 | B1 | 7/2001 | Oka et al. | 701/45 |
| 6,275,146 | B1 | 8/2001 | Kithil | 340/425.5 |
| 6,282,473 | B1 | 8/2001 | Steffens, Jr. | 701/45 |
| 6,283,504 | B1 | 9/2001 | Stanley et al. | 280/735 |
| 6,286,861 | B1 | 9/2001 | Cech et al. | 280/735 |
| 6,310,407 | B1 | 10/2001 | Saito et al. | 307/10.1 |

UNITED STATES PATENT AND TRADEMARK OFFICE
CERTIFICATE OF CORRECTION

PATENT NO. : 6,609,055 B2
DATED : August 19, 2003
INVENTOR(S) : James G. Stanley It is certified that error appears in the above-identified patent and that said Letters Patent is hereby corrected as shown below:

Title page (cont'd),

| | | | | |
|---|---|---|---|---|
| 6,323,444 | B1 | 11/2001 | Aoki | 177/144 |
| 6,325,413 | B1 | 12/2001 | Saito et al. | 280/735 |
| 6,329,913 | B1 | 12/2001 | Shieh et al. | 340/561 |
| 6,329,914 | B1 | 12/2001 | Shieh et al. | 340/561 |
| 6,335,684 | B1 | 1/2002 | Eisenmann et al. | 340/562 |
| 6,341,252 | B1 | 1/2002 | Foo et al. | 701/45 |
| 6,345,543 | B1 | 2/2002 | Aoki | 73/862.474 |
| 6,348,862 | B1 | 2/2002 | McDonnell et al. | 340/562 |
| 6,356,187 | B1 | 3/2002 | Jinno et al. | 340/438 |
| 6,356,194 | B1 | 3/2002 | Fukui et al. | 340/561 |
| 6,366,200 | B1 | 4/2002 | Aoki | 340/438 |
| 6,378,900 | B1 | 4/2002 | Stanley et al. | 280/735 |
| 6,392,542 | B1 | 5/2002 | Stanley | 340/561 |
| 6,397,136 | B1 | 5/2002 | Breed et al. | 701/45 |
| 6,404,074 | B1 | 6/2002 | Saito et al. | 307/10.1 |
| 6,416,080 | B1 | 7/2002 | Gillis et al. | 280/735 |
| 6,422,595 | B1 | 7/2002 | Breed et al. | 280/735 |
| 6,424,268 | B1 | 7/2002 | Isonaga et al. | 340/667 |
| 6,442,465 | B1 | 8/2002 | Breed et al. | 701/45 |
| 6,442,504 | B1 | 8/2002 | Breed et al. | 702/173 |
| 6,445,294 | B1 | 9/2002 | McDonnell et al. | 340/562 |
| 6,445,988 | B1 | 9/2002 | Breed et al. | 701/45 |
| 6,452,870 | B1 | 9/2002 | Breed et al. | 367/99 |
| 6,459,973 | B1 | 10/2002 | Breed et al. | 701/45 |
| 2001/0013697 | A1 | 8/2001 | Saito et al. | 280/735 |
| 2001/0026162 | A1 | 10/2001 | Nagai et al. | 324/687 |
| 2002/0000754 | A1 | 1/2002 | Saito et al. | 307/10.1 |
| 2002/0018000 | A1 | 2/2002 | Jinno et al. | 340/667 |
| 2002/0038947 | A1 | 4/2002 | Baba et al. | 280/735 |
| 2002/0039029 | A1 | 4/2002 | Karray et al. | 324/662 |
| 2002/0059022 | A1 | 5/2002 | Breed et al. | 701/45 |
| 2002/0096869 | A1 | 7/2002 | Kai et al. | 280/735 |
| 2002/0125050 | A1 | 9/2002 | Breed et al. | 177/136 |
| 2002/0125051 | A1 | 9/2002 | Aoki | 177/144 |
| 2002/0140214 | A1 | 10/2002 | Breed et al. | 280/735 |
| 2002/0140215 | A1 | 10/2002 | Breed et al. | 280/735 |
| 2002/0167486 | A1 | 11/2002 | Tan et al | 345/156 |
| 2003/0005775 | A1 | 1/2003 | Washeleski et al. | 73/780 |
| 2003/0009273 | A1 | 1/2003 | Stanley et al. | 701/45 |

Item [57], ABSTRACT,
Line 19, the period after "the" (".") should be deleted

UNITED STATES PATENT AND TRADEMARK OFFICE
CERTIFICATE OF CORRECTION

PATENT NO. : 6,609,055 B2
DATED : August 19, 2003
INVENTOR(S) : James G. Stanley It is certified that error appears in the above-identified patent and that said Letters Patent is hereby corrected as shown below:

Drawings,
Fig. 5, the reference sign associated with the "Disable Side Air Bag" block should be changed from "510" to -- 520 --

Column 1,
Line 9, "In the accompanying drawings:" should be moved after line 10 "BRIEF DESCRIPTION OF DRAWINGS".

Column 3,
Line 46, "(510)" should be changed to -- (520) --.

Column 4,
Line 15, "(510)" should be changed to -- (520) --;
Line 33, -- is -- should be inserted before "disable"; and
Line 37, -- air bag -- should be instead before "inflator".

Column 5,
Line 60, "a" should be deleted after "illustrate".

Column 6,
Line 67, "Wand" should be changed to -- W and --.

Column 9,
Lines 19 and 37, "thorough" should be changed to -- through --.

Signed and Sealed this

Fourth Day of January, 2005

JON W. DUDAS
*Director of the United States Patent and Trademark Office*